(12) United States Patent
Mathys et al.

(10) Patent No.: US 8,794,820 B2
(45) Date of Patent: Aug. 5, 2014

(54) APPARATUS FOR THE HEAT-EXCHANGING AND MIXING TREATMENT OF FLUID MEDIA

(75) Inventors: Peter Mathys, Neuhausen (CH); Sarah Lanfranchi, Zürich (CH)

(73) Assignee: Sulzer Chemtech AG, Winterthur (CH)

( * ) Notice: Subject to any disclaimer, the term of this patent is extended or adjusted under 35 U.S.C. 154(b) by 1012 days.

(21) Appl. No.: 12/074,080

(22) Filed: Feb. 29, 2008

(65) Prior Publication Data

US 2008/0219086 A1 Sep. 11, 2008

(30) Foreign Application Priority Data

Mar. 9, 2007 (EP) .................................... 07103866

(51) Int. Cl.
| | | |
|---|---|---|
| *B01F 5/06* | (2006.01) | |
| *F28D 7/08* | (2006.01) | |
| *F28D 7/16* | (2006.01) | |
| *B01F 15/06* | (2006.01) | |
| *F28F 1/02* | (2006.01) | |
| *F28D 21/00* | (2006.01) | |

(52) U.S. Cl.
CPC ............... *F28D 7/1623* (2013.01); *F28D 7/08* (2013.01); *F28D 2021/0022* (2013.01); *B01F 5/0618* (2013.01); *F28D 7/085* (2013.01); *B01F 15/066* (2013.01); *B01F 2005/0631* (2013.01); *F28F 1/02* (2013.01); *F28D 2021/0052* (2013.01); *B01F 2005/0632* (2013.01)
USPC ............................ 366/147; 366/338; 165/157

(58) Field of Classification Search
CPC ..................................................... B01F 5/061
USPC ................ 165/157–158, 163, 172, DIG. 434, 165/DIG. 507, DIG. 509, DIG. 436, 165/DIG. 497, DIG. 498, DIG. 536, 165/DIG. 537, 160, 177; 366/147, 149, 338
See application file for complete search history.

(56) References Cited

U.S. PATENT DOCUMENTS 822,996 A * 6/1906 Smith ............................ 165/177
1,194,909 A * 8/1916 White ............................ 165/149
(Continued)

FOREIGN PATENT DOCUMENTS

| CN | 2177214 Y | 9/1994 |
|---|---|---|
| DE | 28 39 564 | 3/1980 |

(Continued)

OTHER PUBLICATIONS

Translation of JP 60086383 A (USPTO).*

*Primary Examiner* — David Sorkin
(74) *Attorney, Agent, or Firm* — Francis C. Hand; Carella, Byrne, et al.

(57) ABSTRACT

An apparatus for the mixing conveying of fluids with heat exchange includes a housing with installations that each include a first hollow structure for conveying a first fluid while a second fluid is able to flow around the first hollow structure. The second fluid flows along a main flow direction which is substantially disposed along the longitudinal axis of the housing. A second hollow structure is provided through which the first fluid can flow and which can be flowed around by the second fluid with the second hollow structure being arranged cross-wise with respect to the first hollow structure. The hollow structures have a flow cross-section with a first width B1 and a second width B2, with B1/B2 being larger than one and B1 oriented normally to a plane which contains the longitudinal axis of the housing or a line parallel to the longitudinal axis and an axis of the hollow structure.

15 Claims, 12 Drawing Sheets

(56) References Cited

U.S. PATENT DOCUMENTS

| | | | |
|---|---|---|---|
| 1,355,980 A * | 10/1920 | Jones | 165/160 |
| 1,655,531 A * | 1/1928 | Beyer | 165/150 |
| 1,808,169 A * | 6/1931 | Jacobus | 165/163 |
| 2,324,707 A * | 7/1943 | Johnson | 62/390 |
| 2,429,663 A * | 10/1947 | Beatty | 165/163 |
| 2,519,084 A * | 8/1950 | Tull | 165/158 |
| 2,587,720 A * | 3/1952 | Fritzberg | 165/149 |
| 2,608,390 A * | 8/1952 | Huet | 165/173 |
| 2,643,100 A * | 6/1953 | Bonnaud | 165/81 |
| 2,715,019 A * | 8/1955 | Walter | 165/145 |
| 2,931,711 A * | 4/1960 | Walker | 422/146 |
| 3,112,793 A * | 12/1963 | Sass | 165/175 |
| 3,130,779 A * | 4/1964 | Huet | 165/146 |
| 3,153,446 A | 10/1964 | Shaw | |
| 3,171,477 A * | 3/1965 | Huet | 165/104.21 |
| 3,202,212 A * | 8/1965 | Kritzer | 165/179 |
| 3,229,762 A * | 1/1966 | Vollhardt | 165/157 |
| 3,335,790 A * | 8/1967 | Aranyi et al. | 165/109.1 |
| 3,358,749 A * | 12/1967 | Chisholm et al. | 165/141 |
| 3,483,920 A * | 12/1969 | Heyn et al. | 165/165 |
| 3,692,105 A * | 9/1972 | O'Connor | 165/181 |
| 3,732,922 A * | 5/1973 | Pouderoux | 165/158 |
| 3,746,086 A * | 7/1973 | Pasternak | 165/181 |
| 3,854,528 A * | 12/1974 | Pouderoux et al. | 165/158 |
| 3,991,823 A * | 11/1976 | Litke et al. | 165/145 |
| 4,111,402 A | 9/1978 | Barbini | |
| 4,275,177 A * | 6/1981 | Walkenhorst et al. | 525/53 |
| 4,280,556 A * | 7/1981 | Cooper | 165/76 |
| 4,284,134 A * | 8/1981 | Harris | 165/163 |
| 4,314,606 A | 2/1982 | Muller | |
| 4,800,955 A * | 1/1989 | Hagemeister et al. | 165/163 |
| 4,815,535 A * | 3/1989 | Hagemeister | 165/173 |
| 4,865,460 A * | 9/1989 | Friedrich | 366/337 |
| 4,998,583 A * | 3/1991 | Lahne et al. | 165/163 |
| 5,101,884 A * | 4/1992 | Leidinger | 165/41 |
| 5,484,882 A * | 1/1996 | Takada et al. | 528/361 |
| 5,839,505 A * | 11/1998 | Ludwig et al. | 165/109.1 |
| 6,167,954 B1 * | 1/2001 | Martins | 165/175 |
| 6,412,975 B1 * | 7/2002 | Schuchardt et al. | 366/337 |
| 6,479,624 B2 * | 11/2002 | Wepener et al. | 528/480 |
| 6,877,552 B1 * | 4/2005 | King | 165/163 |
| 7,308,932 B2 * | 12/2007 | Doh et al. | 165/158 |
| 7,311,139 B2 * | 12/2007 | Kern et al. | 165/163 |
| 7,997,327 B2 | 8/2011 | Bucher | |
| 2002/0005275 A1 * | 1/2002 | O'Donnell et al. | 165/109.1 |
| 2004/0069470 A1 * | 4/2004 | Gorbulsky | 165/158 |
| 2004/0089440 A1 * | 5/2004 | Sanders | 165/46 |
| 2004/0125691 A1 | 7/2004 | Streiff | |
| 2005/0077034 A1 * | 4/2005 | King | 165/163 |

FOREIGN PATENT DOCUMENTS

| | | | |
|---|---|---|---|
| DE | 32 12 727 A1 | 9/1983 | |
| EP | 0160717 A1 * | 11/1985 | F28B 1/06 |
| EP | 0 967 004 | 12/1999 | |
| EP | 1 123 730 | 8/2001 | |
| EP | 1 600 708 A1 * | 11/2005 | F24H 1/43 |
| FR | 627576 A * | 10/1927 | F28D 1/53 |
| JP | 57105687 A * | 7/1982 | F28F 1/00 |
| JP | 60086383 A * | 5/1985 | F28D 7/02 |
| WO | WO 2008017571 A1 * | 2/2008 | B01F 15/06 |

\* cited by examiner

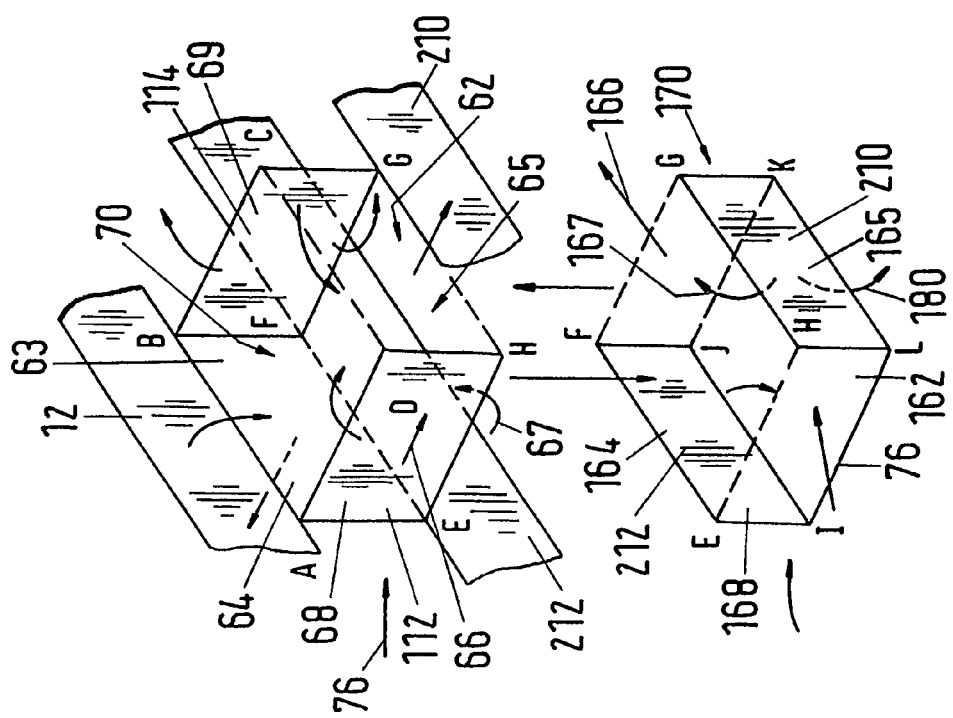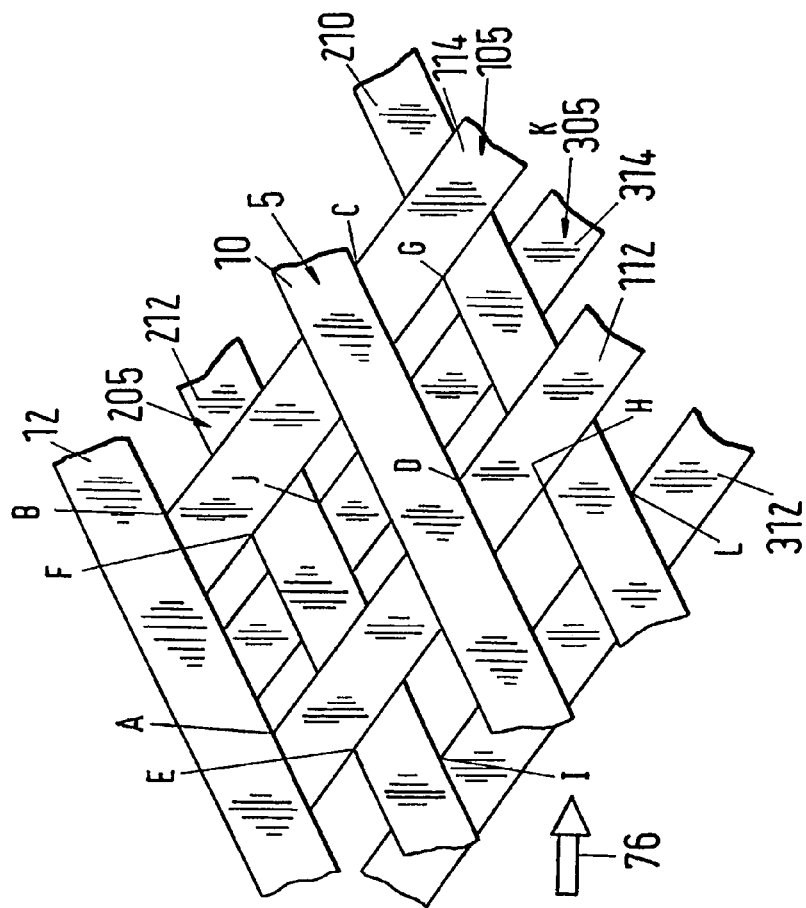
Fig. 8

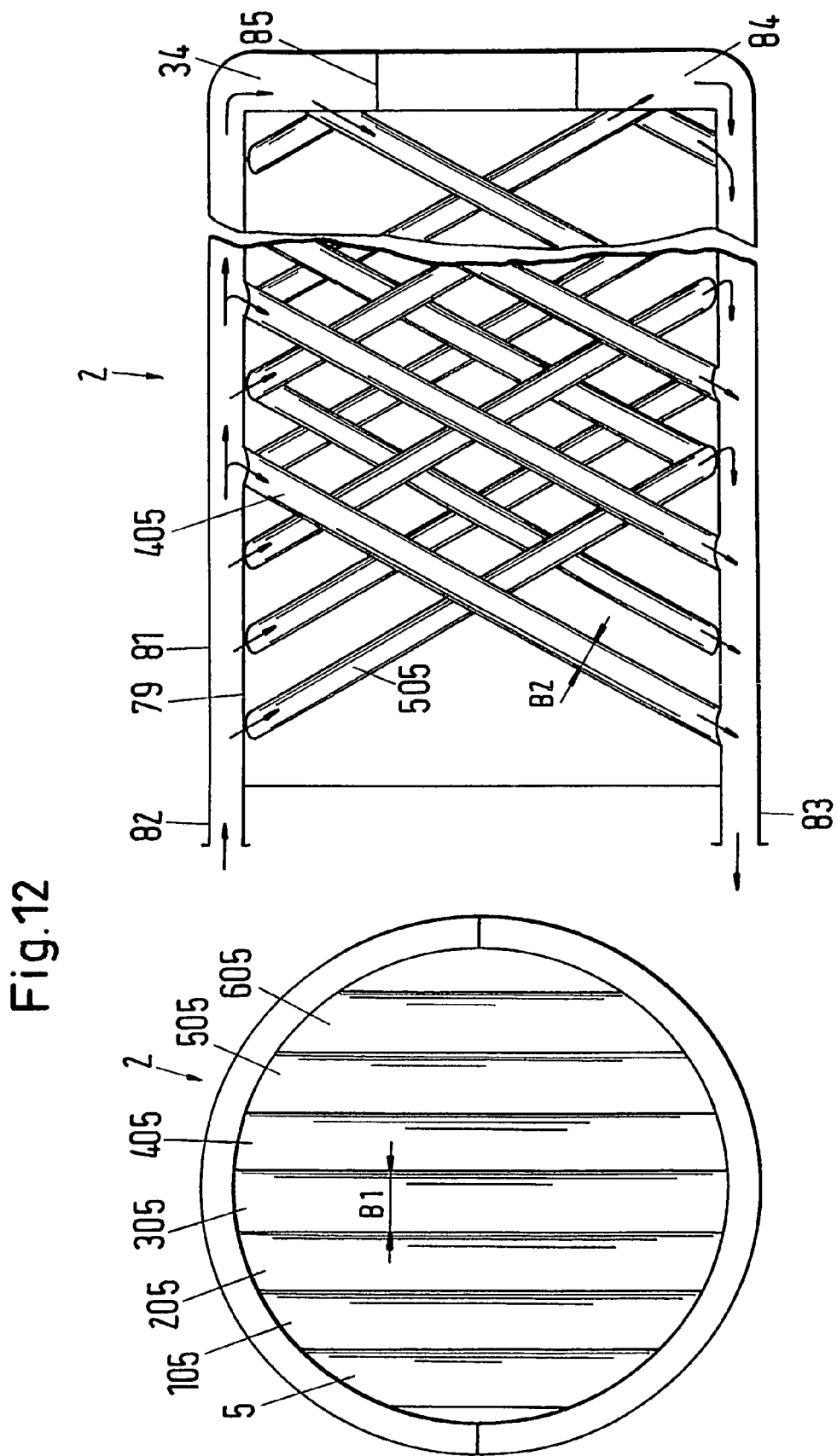

APPARATUS FOR THE HEAT-EXCHANGING AND MIXING TREATMENT OF FLUID MEDIA

The invention relates to an apparatus for the heat exchanging and mixing treatment of fluid media, in particular of low viscosity fluids as well as high viscosity fluids.

An apparatus for the heat exchanging and mixing treatment of low viscosity media as well as of high viscosity media is known from DE 28 39 564.

It is the object of the invention to provide an improvement with respect to the apparatus described in DE 28 39 564 with which the homogeneity of a mixture can be increased and the apparatus being particularly suitable for the processing of high viscosity fluids.

It is another object of the invention to obtain a better mixing of fluid media than that obtained from an apparatus as described in DE 28 39 564.

The apparatus satisfies a heat exchange function and a mixing function, with a first fluid and at least one further fluid flowing through the apparatus. A heat exchange takes place in the apparatus between the first fluid, the heat exchanger fluid, and at least one further fluid. Means are simultaneously provided to mix the further fluid in the apparatus during the heat exchange. A heat exchange as well as a mixing of the further fluid or fluids is carried out in the apparatus.

Briefly, the apparatus for the heat exchanging and mixing treatment of fluid media comprises a housing disposed on a longitudinal axis and a plurality of installations in the housing. Each installation includes at least a first hollow structure and at least a second hollow structure for the passage of a first fluid therethrough and the passage of a second fluid thereover.

The first hollow structure and the second hollow structure are arranged cross-wise with respect to one another and each said hollow structure has a flow cross-section with a first width B1 and a second width B2 perpendicular to the first width B1, with B1/B2 being larger than one and B1 oriented normally to a plane containing the longitudinal axis of the housing or a line parallel to the longitudinal axis and an axis of the hollow structure. A better residence-time distribution can thus be achieved as a consequence of the use of hollow structures for the homogenizing of the fluid. The apparatus works as a mixer or as a heat exchanger or as a combined heat exchange reactor.

The apparatus can additionally be designed as a reactor in which a chemical reaction takes place.

In accordance with a preferred embodiment, the hollow structures include a plurality of connection members through which a compulsory deflection of the first fluid flowing in the interior of the hollow structure is effected.

In accordance with a further embodiment, the housing is formed by an inner wall body and an outer wall body which form a double jacket through which a first fluid can flow. Hollow structures extend in the interior of the inner wall body and are arranged in a cross-wise fashion and into which part flows of the first fluid are introduced so that the first fluid flows through these hollow structures. A second fluid flows around the hollow structures and a heat exchange takes place between the two fluids through the hollow structures and through the dual-tube wall.

In accordance with the first embodiment, according to which the hollow structures have connection members, the second fluid flows through an entry cross-section of the housing along a main flow direction which is disposed along the longitudinal direction of the housing. The first hollow structure includes a first section which extends parallel to the longitudinal axis and has a plurality of connection members into which a compulsory deflection of the first fluid flowing in the interior of the hollow structure takes place. A second section is arranged between a first connection member and a second connection member and the middle flow direction of the first fluid extends at least sectionally at an angle alpha with respect to the longitudinal axis in said second section. The angle alpha is set up between the main flow direction and the common tangent to the axis of the first and second connection members. A second hollow structure is arranged adjacent to the first hollow structure and likewise includes sections which are connected by connection members in which the middle flow direction of the first fluid extends at least sectionally at an angle beta with respect to the longitudinal axis. The angles alpha ($\alpha$) and beta ($\beta$) differ in their signs and/or in their magnitude. The first and the second hollow structures are arranged substantially symmetrically to one another, in particular cross-wise, in accordance with a preferred embodiment.

In accordance with a preferred embodiment, the angles alpha and beta are equal, but have opposite signs. The first and the second connection members have a substantially semi-circular design. The sections of a hollow structure thus have a parallel arrangement.

In accordance with a further embodiment, the first and second connection members have a V-shaped or U-shaped design.

In accordance with a preferred embodiment, a hollow structure is made of one hollow body or of a plurality of hollow bodies in a parallel arrangement to one another. The installations are formed from a minimum of 4 hollow structures and a maximum of 12 hollow structures. A thorough mixing of the second fluid along the path takes place through the 4 to 12 hollow structures.

The first hollow structure and/or the second hollow structure are formed as a bundle of tubes extending substantially in parallel, with the tubes of a bundle being able to be slightly offset with respect to one another and/or with a defined gap being provided between the tubes of a bundle. This gap is thus so narrow that only a small portion of the second fluid flows through it.

The hollow structures have a first surface onto which the second fluid is incident and forms at least two part flows, a first part flow guided along the surface and a second part flow which leaves the surface and is directed into one or more fluid volumes. The fluid volume is made as a prismatic body which has 6 rectangular surfaces which are formed by the rims of the first and second hollow structures and a third hollow structure so that a base surface and a top surface, as well as first and second side surfaces, are open and the other side surfaces are formed from parts of the first surface and a second surface so that the second fluid can flow through the base surface, the top surface and the first and second side surfaces. A continuous division and combination of part flows hereby takes place, whereby a rearrangement and a mixing of the second fluid takes place.

Optionally, a collection element can be attached to a second end of the housing or two hollow structures or two individual hollow bodies of a hollow structure can be connected to one another at a second end of the housing. Some of the hollow structures open into the collection element so that the first fluid is received in the collection element after flowing through the hollow structures.

Some of the hollow structures can be charged with first fluid, starting from the collection element, so that the collection element has the function of a distribution element at least sectionally. Optionally, a collection element can be attached to a first end of the housing or two hollow structures or two individual hollow bodies of a hollow structure can be connected to one another at a first end of the housing.

The first and the second fluid can accordingly be guided to one another both in the counter-flow or the cross-counter-flow and in the parallel flow or the cross-parallel flow.

The second fluid can include components between which a chemical reaction takes place. A spacing is provided between two adjacent hollow structures when the rearrangement and mixing of the components is improved thereby and/or the application requires a reduced surface for the heat exchange with respect to the apparatus volume.

A method for the heat-exchanging and mixing treatment of fluid media is carried out in an apparatus which includes a housing with installations arranged therein, with the installations forming a first hollow structure and a second hollow structure.

In a first step, a first fluid flows through the first hollow structure and the second hollow structure and a second fluid flows around the first hollow structure and the second hollow structure, with the first hollow structure and the second hollow structure being arranged cross-wise with respect to one another. The second fluid is deflected by the hollow structures because the hollow structures have a flow cross-section with a first width B1 and a second width B2, with B1/B2 being larger than one and B1 is oriented normally to a plane which contains the longitudinal axis of the housing or a line parallel to said longitudinal axis and an axis of the hollow structure, so that the fluid is mixed while it flows around the hollow structures.

The apparatus is used for the heat-exchanging and mixing treatment of high viscosity fluids, in particular polymers or foodstuffs.

The invention will be explained in the following with reference to the drawings.

FIG. 8 shows a detail of FIG. 7 as well as a representation of a fluid volume for the explanation of the flow;

FIG. 12 shows two sections through the apparatus in accordance with the third embodiment.

Figure 1:
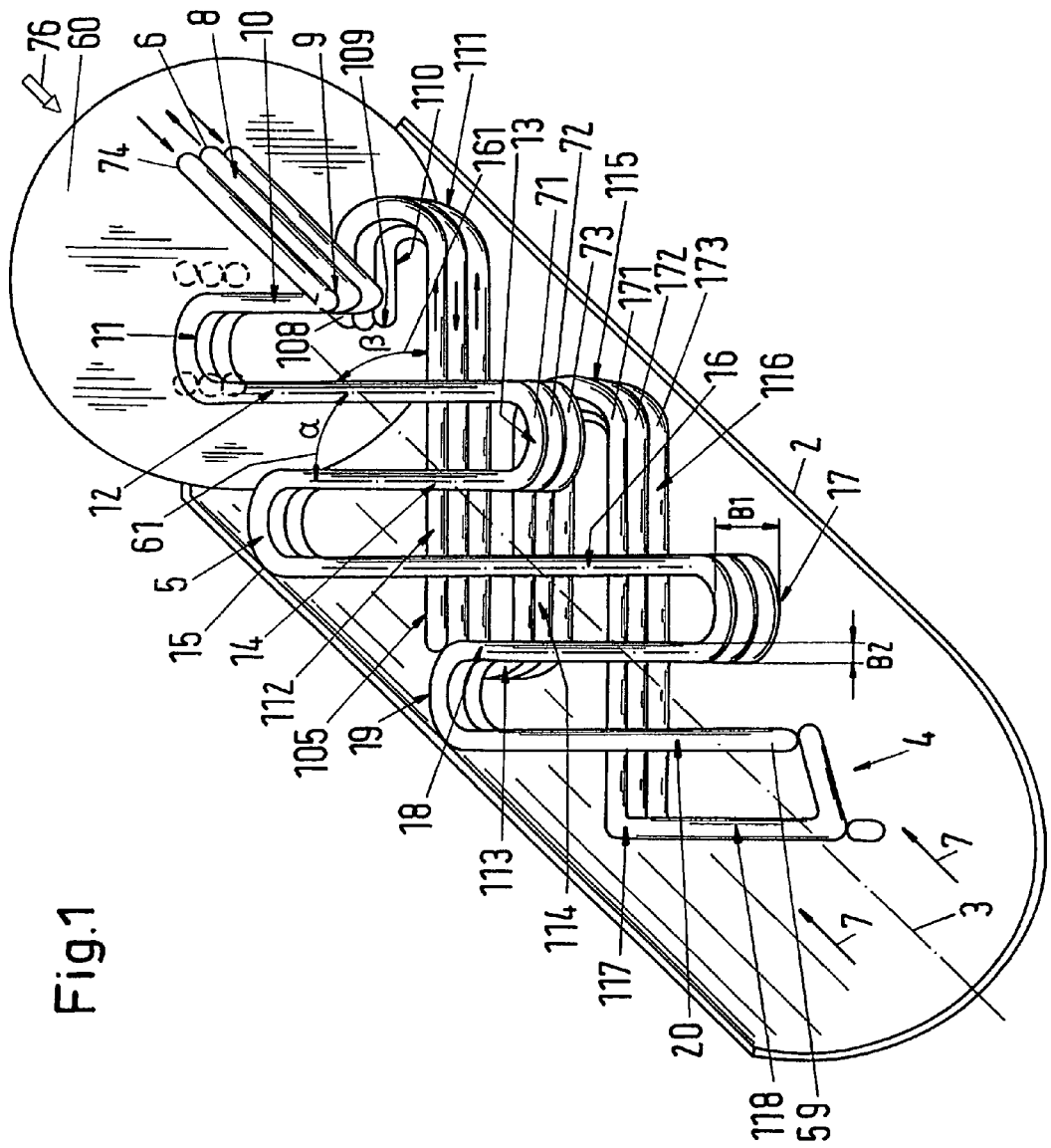
FIG. 1 shows a cut-away view of an apparatus in accordance with a first embodiment.

Referring to FIG. 1, the apparatus for the mixing of fluids during a heat exchange includes a housing 2 with a plurality of installations 4 arranged therein.

Each installation 4 includes a first hollow structure 5 and a second hollow structure 105. A first fluid 6 can flow through the first hollow structure 5 and the second hollow structure 105 and a second fluid 7 can flow around the first hollow structure and the second hollow structure in a direction towards or opposite to the main flow direction 76 depending on the construction of the apparatus.

Each of the hollow structures 5, 105 is made of a plurality of hollow bodies 71, 72, 73; 171, 172, 173 which are arranged next to one another, extend substantially parallel to one another and are to be understood as a single flow obstruction in their effect for the flow of the second fluid 7. As shown in FIG. 1, each hollow body 71, 72, 73; 171, 172, 173 is made as a tube with a circular cross-section.

As viewed, the uppermost hollow body 71 is clamped into a base 60 at a first end 74, extends into the inner space of the housing 2 and ends in a deflection element 59 that opens into the hollow body 72 immediately below. The middle hollow body 72 is arranged parallel to the hollow body 71 and extends from the deflection element 59 up to the base 60. The two hollow bodies 71, 72 thus guide the first fluid 6 through the inner space of the housing 2 in the form of a loop. A closed passage is thus formed by the hollow body 71 for the first fluid 6 which flows through the hollow body 71 in the opposite direction to the flow of the fluid 6 in the hollow body 72.

Figure 2:
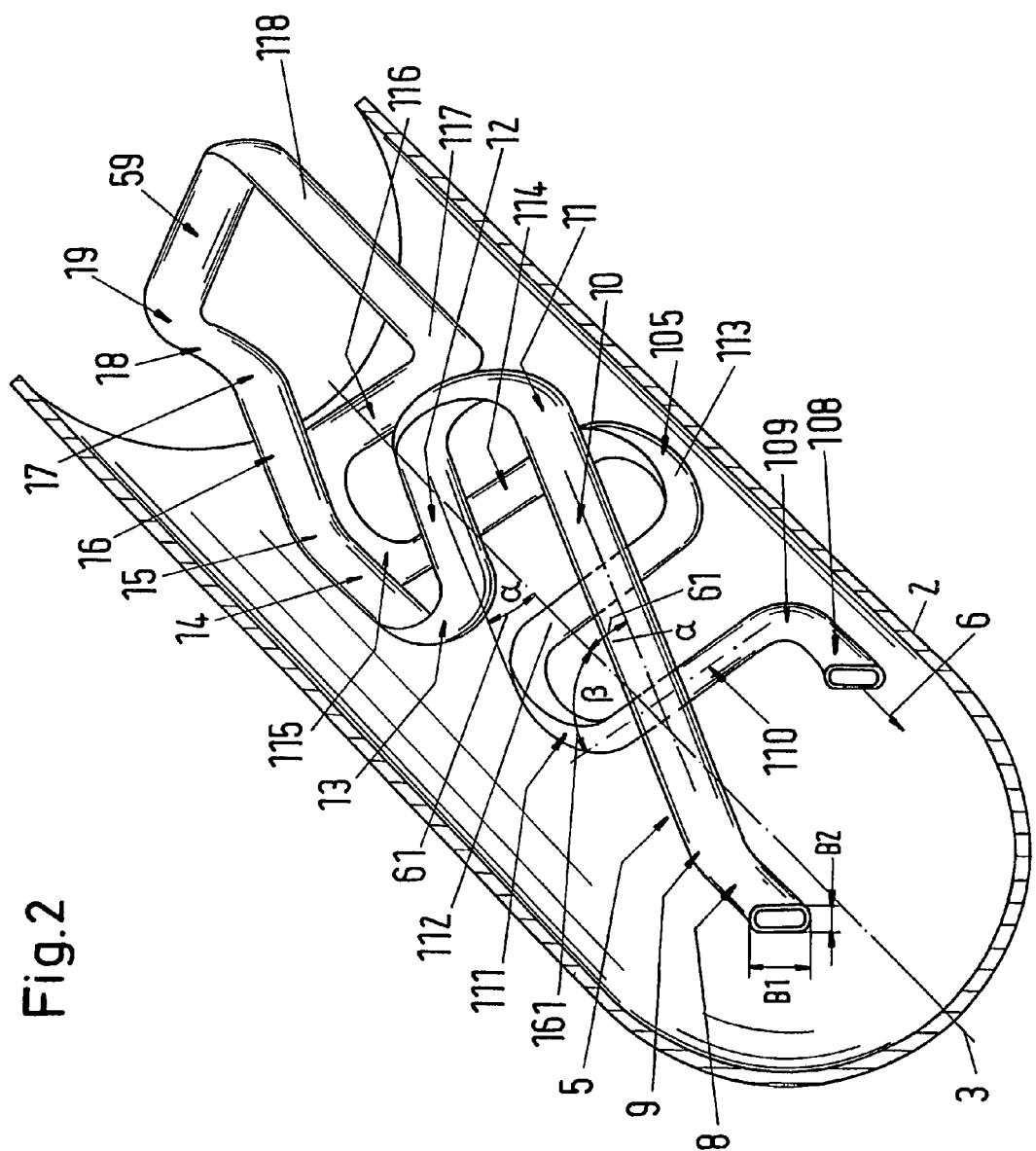
FIG. 2 shows a view of the apparatus in accordance with a second embodiment.

The deflection element 59 can alternatively also open into the lowermost hollow body 73, 171, 172, 173 (or further ones) and can in particular also have a longer extent perpendicular to the longitudinal axis 3, which is shown in the drawing in FIG. 2. Alternatively to the arrangement as a loop, the hollow bodies can be arranged analogously to the arrangement described in EP06118609.

The base 60 can include chambers into which the hollow bodies extend or into which the hollow bodies open and into which the first fluid 6 is fed and/or removed. Furthermore, the base 60 can include openings through which the second fluid 7 flows into the housing or exits the housing. These openings are not shown in the drawings.

The first hollow structure 5 and the second hollow structure 105 are arranged cross-wise with respect to one another. The first hollow structure 5 includes a first section 8 which extends parallel to the longitudinal axis 3 and a plurality of connection members 9, 11, 13, 15, 17, 19 in which a compulsory deflection of the first fluid 6 flowing in the interior of the first hollow structure takes place. A second section 10 is arranged between a first connection member 9 and a second connection member 11 and the middle flow direction of the first fluid extends at least sectionally at an angle $\alpha$ 61 with respect to the longitudinal axis 3 in the second section, said angle $\alpha$ being set up between the longitudinal axis 3 and the second section 10 or the third section 12 extending parallel thereto. If the second section 10 is not a straight piece, but a curved piece of any desired shape, the two end points of adjacent connection members 9, 11 are connected to one another on the axis of the first hollow structure 5. The angle set up between this imaginary straight connection line and the longitudinal axis 3 corresponds to the angle 61.

A second hollow structure 105 is arranged at the interior of the housing 2 through which the first fluid 6 can flow and around which the second fluid 7 can flow. The second hollow structure 105 includes a first section 108 which extends parallel to the longitudinal axis 3 and a plurality of connection members 109, 111, 113, 115, 117 in which a compulsory deflection of the first fluid 6 flowing in the interior of the hollow body 105 takes place. A second section 110 is arranged between the first connection member 109 and the second connection member 111 and the flow direction of the first fluid extends at least sectionally at an angle $\beta$ 161 with respect to the longitudinal axis 3 in the second section, the angle $\beta$ being set up between the longitudinal axis 3 and the second section 110 or the third section 112 extending parallel thereto. The statements on the first hollow structure described above apply analogously to sections 110, 112 which are made as curved pieces of any desired shape. The above statements apply in the same way to the sections 14, 16, 18, 20, 114, 116, 118. The second sections 10, 110 and the third sections 12, 112 of adjacent hollow structures 5, 105 are therefore arranged cross-wise to one another in accordance with FIG. 1 analogously to all further sections shown. The angles α 61 and β 161 have substantially the same magnitude, but opposite signs, in the embodiment in accordance with FIG. 1.

Each curved connection member 9, 11, 13, 15, 17, 19, 109, 111, 113, 115, 117 is of semi-circular shape or has the shape of an arc of a circle in accordance with FIG. 1.

The hollow structures 5, 105 have a flow cross-section in a sectional plane arranged normal to the axis of a section of a hollow structure having a first width B1 and a second width B2 perpendicular to the first width B1. Width B1 is oriented normally to a plane which contains the longitudinal axis 3 of the housing or a line parallel to said longitudinal axis and an axis of the hollow structure 5, 105. In this connection, the width B1 means the width of all hollow bodies 71, 72, 73 belonging to the first hollow structure 5 or of all hollow bodies 171, 172, 173 belonging to the second hollow structure 105. The width B2 is the cross-sectional dimension of the hollow structure 5 (i.e. the total height, as viewed, of the three bodies forming the hollow structure 5) or the smallest cross-sectional dimension of the hollow structure. The width B1 is the cross-sectional dimension of the hollow structure arranged perpendicular to B2.

The widths B1 of the hollow structure 5 and of the hollow structure 105 are identical in this embodiment.

The hollow bodies 71, 72, 73 belonging to the hollow structure 5 are arranged substantially adjacent to one another so that a group of hollow bodies (for example the group 71, 72, 73 or the group 171, 172, 173) represents an obstacle for the flow of the second fluid 7. Alternatively to this, the hollow bodies of a hollow structure can also be arranged slightly offset to one another. A gap, not shown, can also remain between the hollow bodies. At most, a small portion of the second fluid 7 should flow through this gap, the larger portion of the second fluid is deflected before becoming incident onto the hollow bodies so that the larger portion of the second fluid flows around the hollow structure or flows along it. The same applies analogously to the hollow bodies 171, 172, 173 belonging to the hollow structure 105. A spacing can likewise be provided between adjacent hollow structures 5, 105.

The connection members of the hollow structures 5, 105, which are located in the proximity of the housing 2, are arranged offset, which is not shown in FIG. 1, for the better utilization of the mixing and heat exchange space available. This means that in particular the curved connection members 9, 11, 13, 15, 17, 19 of the first hollow structure 5 or the curved connection members 109, 111, 113, 115, 117 of the second hollow structure 105 close to the rim are designed as tube bends arranged offset to one another in accordance with FIG. 5 since they are matched to the shape of the housing 2. The spacings between the tube bends and the housing are minimized by this offset.

Referring to FIG. 2, wherein like reference characters indicate like parts as above, the first hollow structure 5 is made of a single hollow body that has a width B1 and a width B2, with the ratio of B1 to B2 being larger than 1, and thereby forms a flow passage in the interior of the hollow body with a substantially oval cross-section, which applies in the same way to the second hollow structure 105. The angles α 61 and β 161, which have been described in detail in conjunction with FIG. 1 differ in their sign and/or in their magnitude.

Figure 3:
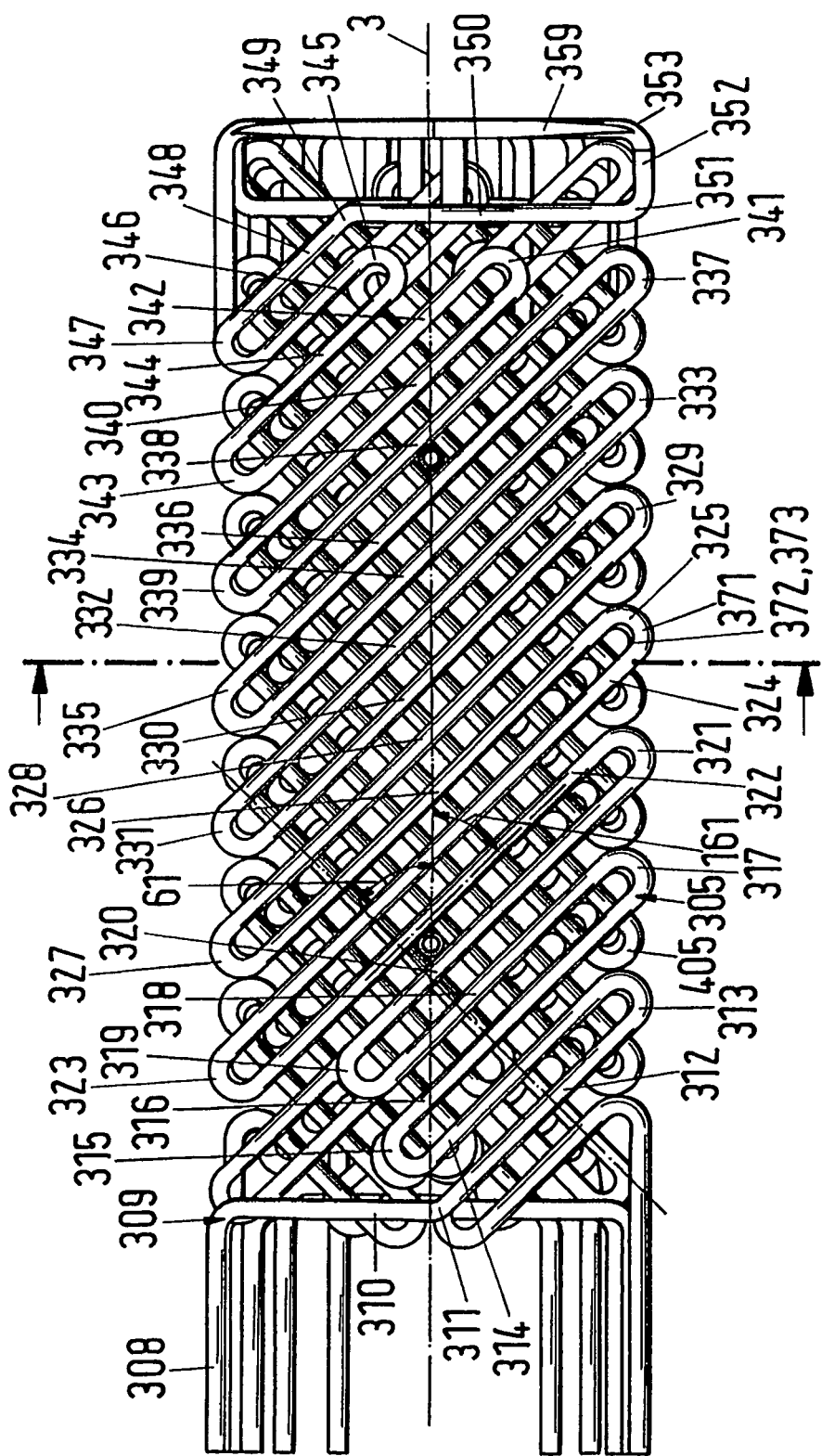
FIG. 3 shows a longitudinal section through an apparatus in accordance with the first embodiment.

Referring to FIG. 3, adjacent hollow bodies 371, 372, 373 are arranged sequentially from the view of the observer. FIG. 3 is a section along a sectional plane containing the longitudinal axis 3 and parallel to the plane which contains the first hollow structure 5 in accordance with FIG. 1.

The hollow structure 305 is arranged at an angle β 161 to the longitudinal axis 3. The hollow structure 405 which is arranged at an angle alpha 61 to the longitudinal axis 3 is partly visible behind the hollow structure 305. In this special case, the angle α 61 and the angle β 161 are equal in magnitude and amount to approximately 45°. Substantially more connection members are provided in contrast to FIG. 1. In accordance with a variant, the hollow structures can be replaced at least partly by structures without an inner hollow space or with an inner hollow space through which a first fluid does not flow. These variants are in particular used when the required heat exchange surface is small.

Figure 4:
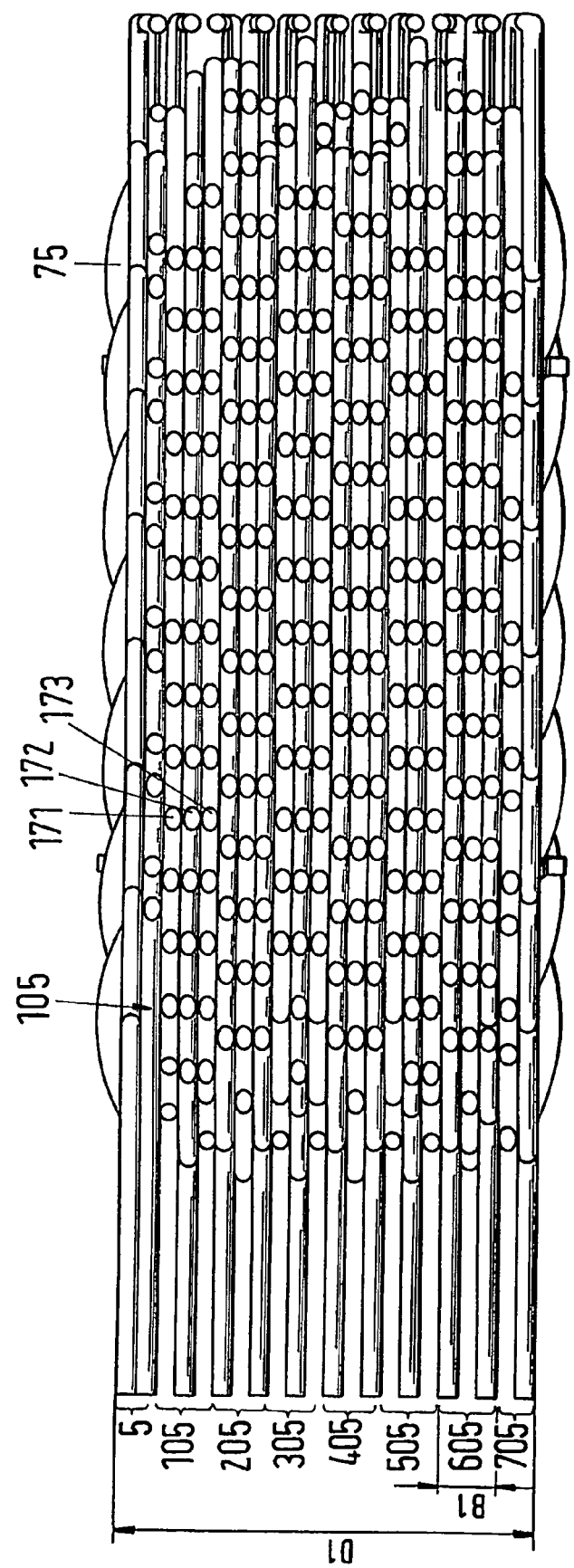
FIG. 4 shows a further longitudinal section through the apparatus in accordance with FIG. 3 in a sectional plane which is arranged normal to the sectional plane of FIG. 3.

FIG. 4 shows a further longitudinal section through the apparatus in accordance with FIG. 3 in a sectional plane which is arranged normal to the sectional plane of FIG. 3. The hollow structures 5, 105, 205, 305, 405, 505, 605, 705 are in turn made as bundles of hollow bodies, in particular tubes with circular cross-sections, in this example. Each of the hollow structures has a flow cross-section with a first width B1 and a second width B2, with B1/B2 being larger than one and B1 being oriented normally to a plane which contains the longitudinal axis 3 of the housing or a line parallel to said longitudinal axis and an axis of the hollow structure 5, 105.

In this connection, the width B1 means the width of a bundle of hollow bodies belonging to a hollow structure. In this special case, the ratio of B1/B2 for the hollow structures 105, 205, 305, 405, 505, 605 amounts to precisely 3. In the hollow structures located at the rim, the ratio B1/B2 amounts to precisely 2. It can furthermore be seen in FIG. 4 that a plurality of hollow structures 5, 105, 205, 305, 405, 505, 605, 705) can be provided. It has proven to be ideal for the mixing effect if between 4 and 12 hollow structures are used. At least some of the hollow structures can also be designed in accordance with the embodiment in accordance with FIG. 2. All the hollow structures are arranged in a housing (not shown). The housing preferably has a circular cross-section, in particular when the second fluid 7 has to be conveyed through the apparatus under high pressure. To utilize the available mixing space to the optimum, the hollow structures are preferably arranged in an enveloping cylinder with the diameter D1. Square or rectangular housing shapes can also be provided instead of a circular one, in particular, if the internal pressure does not differ substantially from the ambient pressure. The ratio of the width B1 to the diameter D1 of the totality of the hollow structures in accordance with FIG. 4 accordingly amounts to $1/12$ to $1/4$. Spacings or guide elements 75 are not taken into account here. The diameter D1 should differ as little as possible from the inner diameter of the housing to avoid marginal effects which have a negative effect on the homogeneity of the mixture. To avoid marginal effects, sector-like guide elements 75 can be attached to the hollow bodies disposed at the rim, whereby it is ensured that marginal flows are also detected and deflected.

The apparatus in accordance with FIG. 1, 3 or 4 is made of a tubular housing with hollow structures formed by tubular loops arranged therein. The hollow structures are shown as bands for reasons of simplification in the representation in FIG. 7. The width of the bands corresponds to the previously defined value B1. An optimum homogeneity is achieved with respect to mixing quality and heat exchange over the whole cross-section of the enveloping cylinder described above by the deflection to be described in more detail in the following of the flow of the second fluid 7 by the formation of the bands. A pronounced plug flow behavior of the second fluid 7 flowing through the housing can thus be observed, which is illustrated by the trial series shown in FIG. 6. The apparatus in accordance with the invention with plug flow behavior is in particular suitable for high viscosity Newtonian liquids and non-Newtonian liquids which, inter alia, also tend to the effects known in the literature as channeling and maldistribution and/or have a behavior critical for residence time for reactions with large heat generation or with large heat consumption. The mixing effect and thus the heat transfer power is at an optimum with an arrangement of 4 to 12 hollow structures, in particular for the previously named types of fluid.

Figure 5:
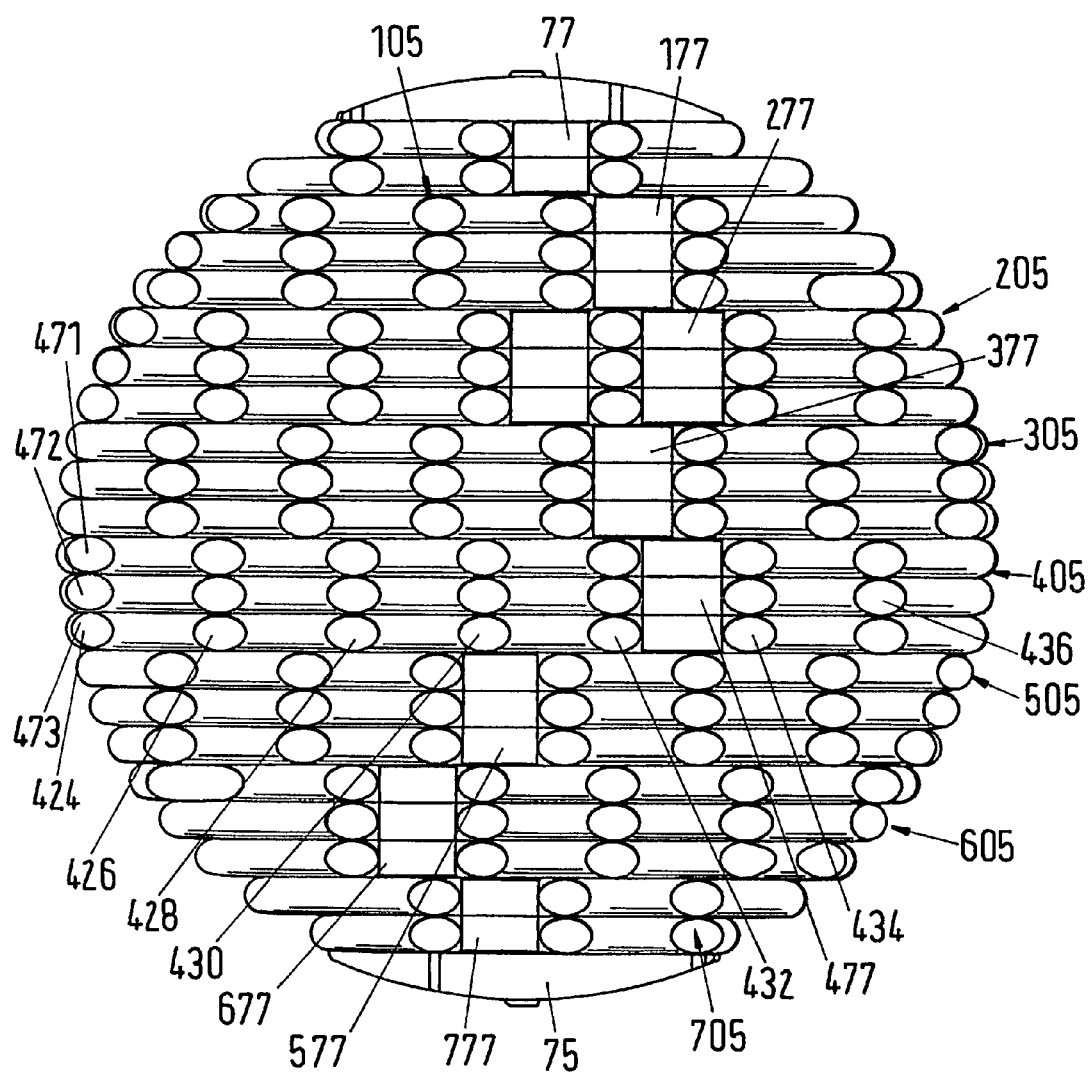
FIG. 5 shows a section through the apparatus in accordance with FIG. 3 which is arranged in a plane normal to the longitudinal axis of the apparatus.

Referring to FIG. 5 which shows a section through the apparatus in accordance with FIG. 3 arranged in a plane normal to the longitudinal axis of the apparatus. It is in particular shown in FIG. 5 that more than two sections 424, 426, 428, 430, 432, 434, 436 of a first hollow structure 405 are cut by such a sectional plane. Such a part element 477 of the hollow structure 405 is laterally bounded, for example, by the sections 432 and 434 of the hollow structure. The second fluid flows through this part element 477 as well as the adjacent part elements in the same hollow structure 405 as well as similar part elements 77, 177, 277, 377, 577, 677, 777 of the adjacent hollow structures 5, 105, 205, 305, 505, 605, 705. The view of the part element 477 corresponds to the projection of two side surfaces of the prismatic body shown in FIG. 8. If the side surfaces are inclined by the angles α and β of the same magnitude, but of opposite signs, with respect to the main flow direction 76 (FIG. 8) of the second fluid, this projection surface contains a diagonal of the prismatic body. The second fluid 7 thus flows proportionally through each of the part elements 477. Part elements 477 whose side edges 35 are formed by hollow bodies of the hollow structure 405 are arranged offset to the part elements 377 or 577 shown in FIG. 5. In this case, more than two sections 424, 426, 428, 430, 432, 434, 436 of the hollow structure 405 as well as of the other shown hollow structures 5, 105, 205, 405, 505, 605, 705) are also in the sectional plane. The marginal elements 77, 777 in the topmost and bottommost marginal regions shown in FIG. 5 in this embodiment have a smaller surface than the part elements 177, 277, 377, 477, 577, 677. The marginal region contains a sector-like guide element 75 to prevent a substantial portion of the second fluid 7 from not taking part in the mixing, but flowing substantially along the inner wall of the housing along the otherwise open marginal region. Such flow behavior can also occur in heat exchange reactors in accordance with the prior art in accordance with FIG. 6. The mixture is not sufficiently homogenous and the heat exchange is also not ensured to a sufficient degree.

Figure 6:
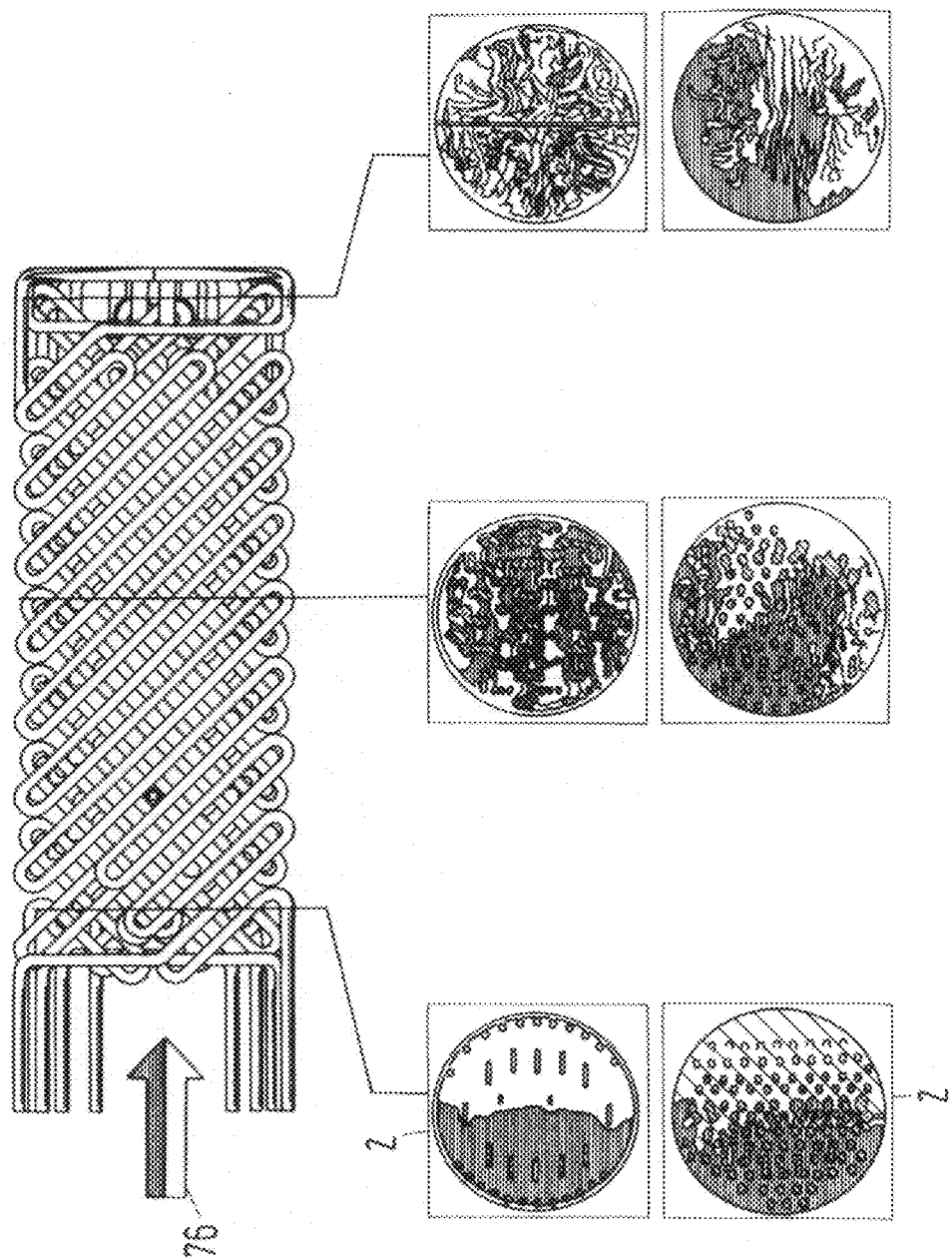
FIG. 6 shows a representation of the progressive mixing of a second fluid made up of two components along the longitudinal axis of the apparatus.

FIG. 6 shows a representation of the progressive mixing of a second fluid made up of two components along the longitudinal axis of the apparatus. The second fluid 7 can also be made of more than two components. An apparatus 1 in accordance with the embodiment shown in FIG. 4 is shown in the upper part. Two rows of sections are arranged thereunder and are made at the points of the apparatus marked with connection lines. The upper row of sections shows the progress of the mixing of a second fluid 7 which is made up of two components which have different colors. The lower row shows the mixing of the two components in an apparatus in accordance with the prior art. It becomes particularly clear from this illustration that a mixing of the components by means of the apparatus is present after approximately half the mixing path and a progressing homogenizing of the mixture takes place in the second half of the mixing path so that the strand formation occurring in the first half of the mixing path largely disappears. After a mixing path which amounts to at least approximately 2.5 times the value of the diameter D1 of the apparatus, a substantially homogeneous mixture is present. In accordance with the apparatus in accordance with the prior art which does not include any hollow structures with a ratio of B1 to B2 larger than one, but rather tubes which are arranged cross-wise with respect to one another, no substantial mixing of the two components takes place along the same mixing path, but only a specific rearrangement by an angle between 45 and 90°. Even in the discharge region there is a large region which is dominated by the component colored black as well as a region which is dominated by the component colored white. FIG. 6 thus clearly shows the surprising effect which is achieved with the apparatus in accordance with the invention.

Figure 7:
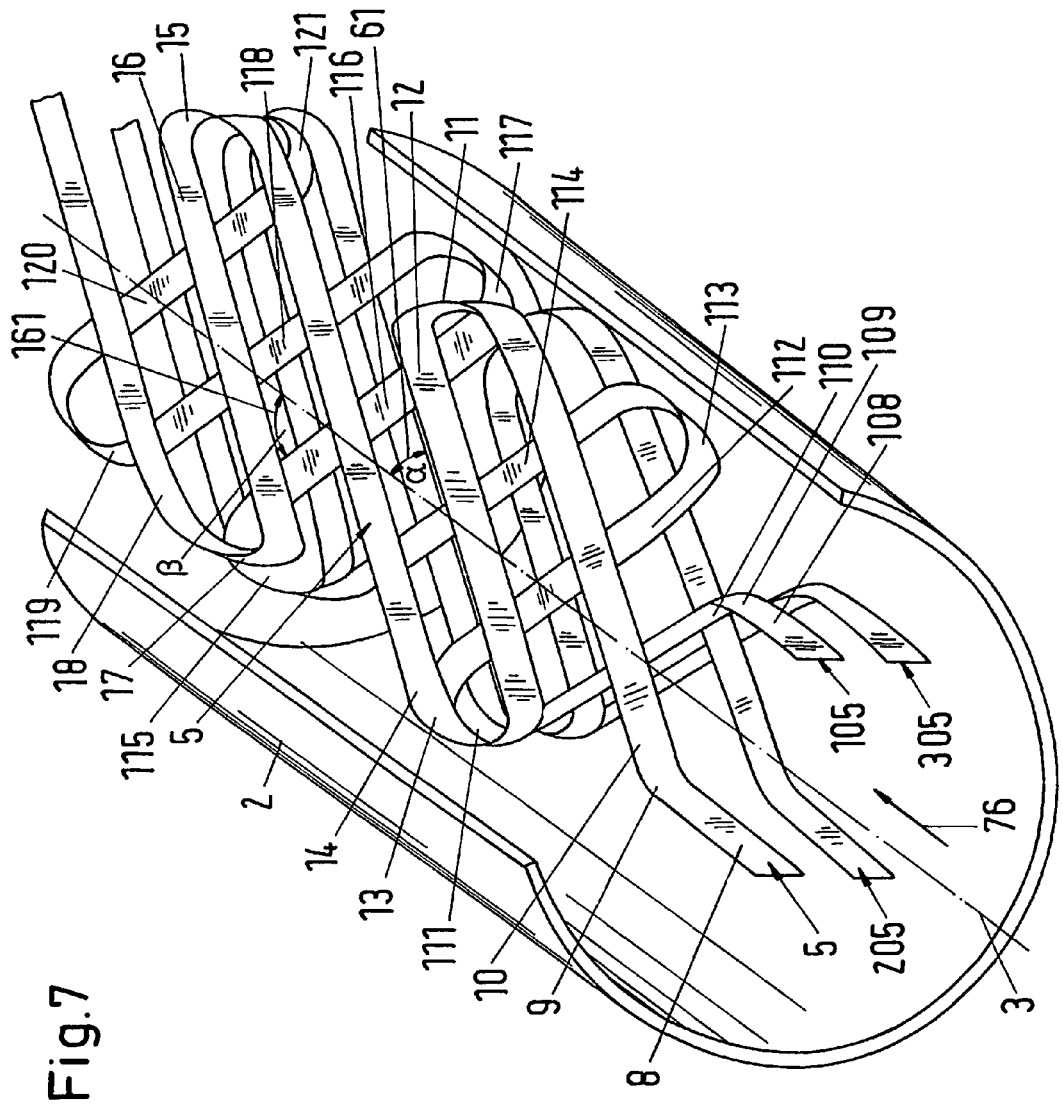
FIG. 7 shows a schematic view of the apparatus for the explanation of the mixing effect of the installations.

FIG. 7 shows a schematic view of the apparatus for the explanation of the mixing effect of the installations. The flow behavior of the second fluid 7 around the hollow structures is comparable with the flow behavior around a band such as is shown in FIG. 7. The second fluid flows through an entry cross-section of the housing 2 along a main flow direction 76 which is substantially disposed along the longitudinal axis 3 of the housing 2. If the second fluid 7 is deflected onto a hollow structure 5, 105, 205, 305, the flow is deflected and a heat transfer subsequently takes place, with the second fluid 7 being either heated or cooled. The second fluid 7 is thus incident onto the surface of the hollow structure 5, 105, 205, 305 with the width B1. In FIG. 7, only a section of such an arrangement of hollow structures is shown; for the simplification of the illustration and for an increase in clarity, only four adjacent hollow structures 5, 105, 205, 305 are shown. The first hollow structure 5 includes a plurality of sections 10, 12, 14, 16, 18 which are arranged at an angle α 61 to the longitudinal axis 3 and a plurality of connection members 9, 11, 13, 15, 17 which are arranged between the sections 8, 10, 12, 14, 16, 18. The second hollow structures 105, 305 include a plurality of sections 110, 112, 114, 116, 118, 120 which are arranged at an angle β 161 to the longitudinal axis 3 and a plurality of connection members 109, 111, 113, 115, 117, 119, 121 which are arranged between the sections 108, 110, 112, 114, 116, 118, 120. The hollow structure 205 has the same design as the hollow structure 5 and the hollow structure 305 has the same design as the hollow structure 105 so that these two hollow structures will no longer be described in detail.

FIG. 8 shows a section of four hollow structures 5, 105, 205, 305 of the embodiments of FIGS. 1, 7, 11 and 12 as well as a representation of a fluid volume for the explanation of the flow of the second fluid 7. The main flow direction 76 of the second fluid 7 is schematically indicated by an arrow. A part of the section 10 and of the section 12 of the hollow structure 5 as well as a part of the section 112 and of the section 114 of the hollow structure 105 are arranged crosswise with respect to one another. A part of the section 210 and of the section 212 of the hollow structure 205 as well as a part of the section 312 and of the section 314 of the hollow structure 305 are arranged cross-wise with respect to one another. The crossing points of the sections 10, 12, 112, 114, 210, 212 are designated by A, B, C, D, E, F, G, H. If the sections are shown in simplified form as flat, very thin bands (i.e. B2 moves towards zero), a fluid volume is enclosed by the crossing points A, B, C, D, E, F, G, G which is made as a prism, in particular as a parallelepiped which has the corner points A, B, C, D, E, F, G, H, as is shown in the right hand part of FIG. 8. The fluid volume 70 has a first surface 68 which is bounded by the corner points A, D, H, E and which is formed by a part of a second section 112 of the second hollow structure 105. The fluid volume 70 has a second surface 69 which is bounded by the corner points B, C, G, F and which is formed by a part of the section 114 of the hollow structure 105.

The hollow structures 5, 105 thus have a first side surface 68 onto which the second fluid 7 is incident and along which a first part flow 66 is guided. A second part flow 67 exits the side surface 68 and is guided into the fluid volume 70, into the fluid volume 170 disposed thereunder or in the fluid volume disposed thereabove. The fluid volume 70 includes a base surface 62 with the corner points E, F, G, H and a top surface 63 with the corner points A, B, C, D, as well as a third side surface 64 with the corner points, A, B, E, F and a fourth side surface 65 with the corner points C, D, G, H, with the side surfaces 64 and 65 being open and the first side surface 68 being formed from the section 112 and the second side surface 69 being formed from the section 114.

The second fluid 7 can thus flow through the base surface 62, the top surface 63 and the third and fourth side surfaces 64, 65 so that a continuous dividing and combining of part flows takes place, whereby a rearrangement and mixing of the second fluid 7 takes place. A fluid volume 170 adjoining the fluid volume 70 is drawn offset with respect to its position in the apparatus in the right hand part of Fig. to make the representation clearer. The fluid volume 170 is disposed exactly beneath the fluid volume 70. The fluid volume 170 is likewise formed as a rectangular prism and is bounded by the corner points E, F, G, H, I, J, K, L. The fluid volume 70 and the fluid volume 170 have a common base surface or top surface 62 which are set up by the corner points E, F, G, H. The side surface 164 with the corner points E, F, I, J is formed by the section 212 and the side surface 165 with the corner points G, H, K, L is formed by the section 210 of the hollow structure 205. The second fluid 7 enters via the open side surface 168 with the corner points E, H, I, L, a first part flow 166 is deflected by the angle 61 which the section 210 includes with the main flow direction 76 of the second fluid 7 extending in the direction of the longitudinal axis 3 (shown in FIG. 7). A further part flow 167 exits through the top surface 62 with the corner points E, F, G, H and a further part flow 180 exits the base surface 162 with the corner points I, J, K, L of the fluid volume 170. An entry and an exit of part flows (67, 167) thus takes place simultaneously via this top surface or base surface 62 so that a mixing of the second fluid 7 takes place.

Figure 9:
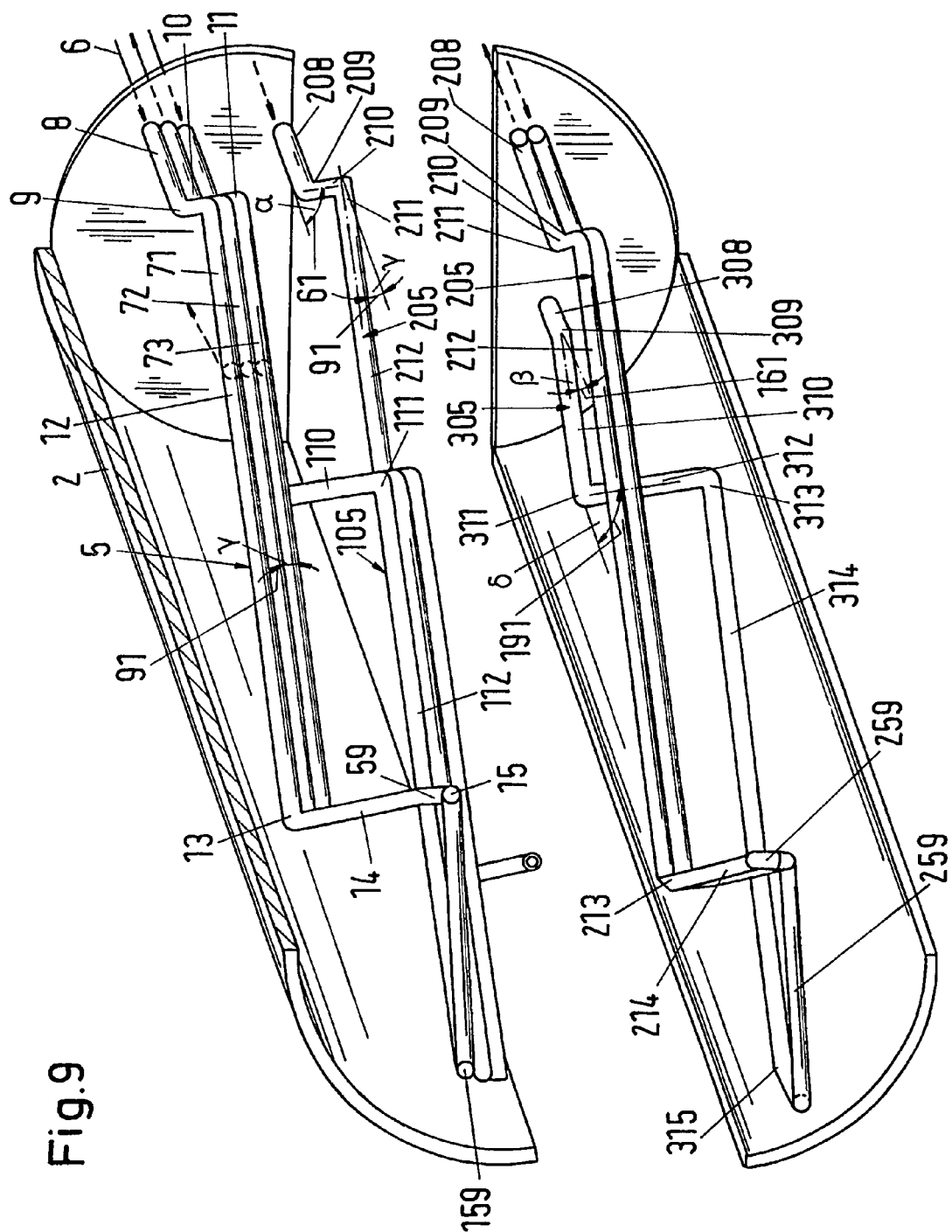
FIG. 9 shows a view of a first embodiment with V-shaped deflections.

A further embodiment of an apparatus for the heat exchanging and mixing treatment of fluid media is shown in FIG. 9. In the representation of FIG. 9, the housing 2 is cut open and a lower part of the installations is shown drawn offset in the vertical direction so that the installations 4 formed as first and second hollow structures 5, 105, 205, 305 are made at least partly visible. The representation of a part of the installations has been omitted for reasons of simplification. The connection members 11, 13, 15, 111, 211, 213, 311, 313 are made in a V shape. It is also possible in accordance with this embodiment to guide the first fluid 6, which flows inside the hollow structures 5, 105, 205, 305, in the opposite direction inside some of the hollow bodies 71, 72, 73. Alternatively to this, the entry of the first fluid 6 into the hollow bodies can take place at a first end of the housing and the exit can take place at a second, oppositely disposed end of the housing, which is not shown in the Figure. The angle α 61 and the angle γ 91 are set up alternately between the longitudinal axis 3 of the housing 2 and the limbs of the V shaped sections which are formed by the sections 10, 12, 14, 210, 212, 214 of the first hollow structures 5, 205. The angle β 161 and the angle δ 191 are set up alternately between the longitudinal axis 3 of the housing 2 and the limbs of the V-shaped sections which are formed by the sections 110, 112, 310, 312, 314, of the first hollow structures 105, 305. The angles α and γ or β and δ are admittedly now set up alternately by the sections of the same hollow structure parallel to the longitudinal axis, but the model of the fluid flow for the second fluid 7 shown in FIGS. 7 and 8 is nevertheless to be used in the same way for this embodiment and the variant in accordance with FIG. 10 to be described in the following. A further possibility consists of providing the exit of the first fluid 6 into a collection unit or collector. At least part flows of the first fluid 6 are guided together in this collector unit and subsequently redistributed to the first and second hollow structures 5, 105, 205, 305 (not shown).

Figure 10:
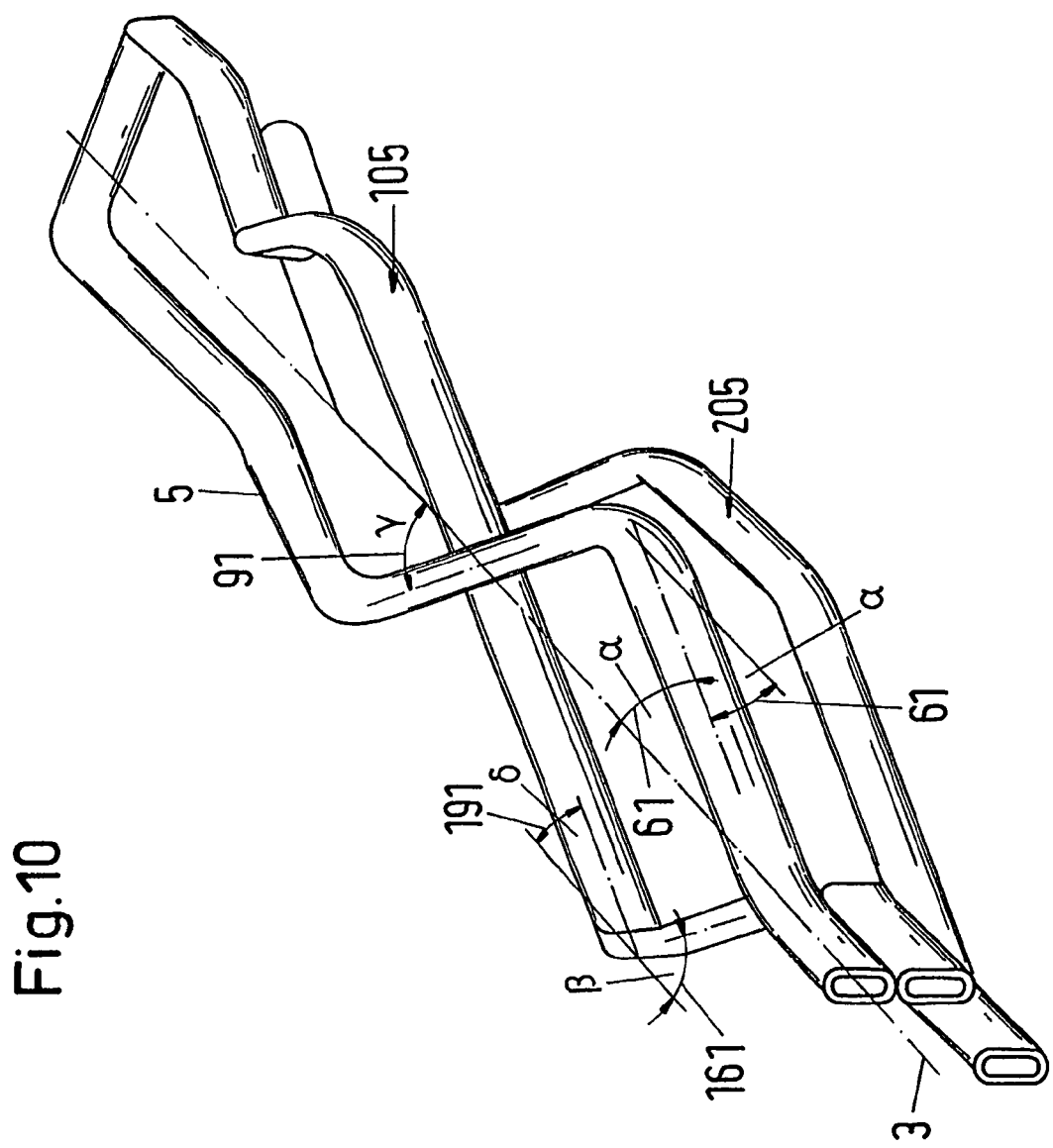
FIG. 10 shows a view of a variant of the embodiment in accordance with FIG. 9 with V-shaped deflections.

FIG. 10 shows a view of a variant of the embodiment in accordance with FIG. 9, with hollow structures in accordance with FIG. 2 being used. The mixing principle shown in FIGS. 7 and 8 is also realized for V-shaped portions with limbs which are arranged at different angles α 61 and γ 91 as well as β 161 and δ 191 for the longitudinal axis 3.

Figure 11:
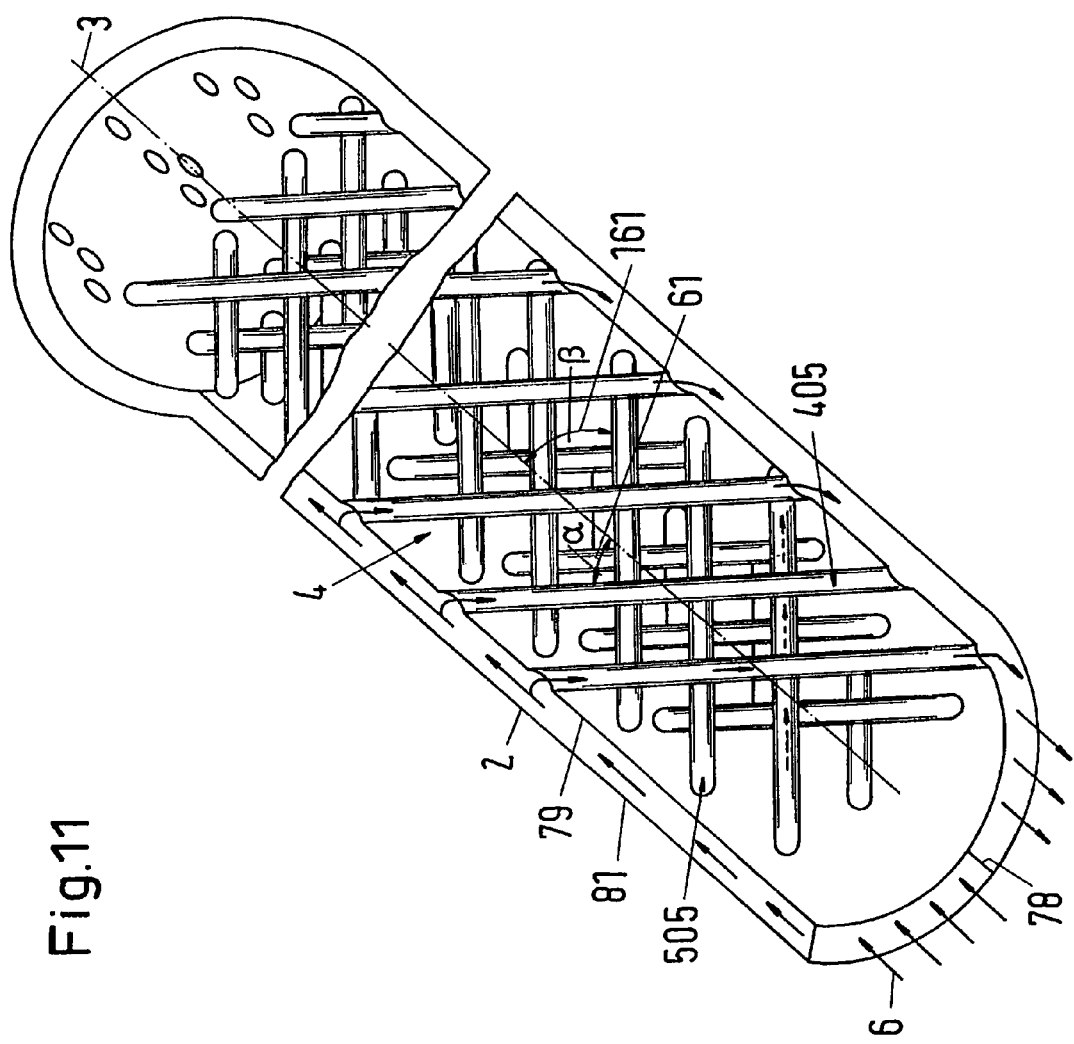
FIG. 11 shows a view of the apparatus in accordance with a third embodiment.

FIG. 11 shows a view of an apparatus for the heat-exchanging and mixing treatment of fluid media in accordance with a third embodiment according to which the first hollow structures 5, 205, 405, 605 and the second hollow structures 105, 305, 505 are arranged cross-wise with respect to one another. See FIG. 12, left hand part, for the designation of the hollow structures. The housing 2 is made as a double jacket inside of which the first fluid 6 flows. A separation element 78 is arranged between the two wall bodies 79, 811 of the double jacket and regions of opposite flow direction can be separated from one another by this in the interior of the double jacket. The double jacket is shown cut open in FIG. 11, and indeed in a plane which contains the longitudinal axis 3 of the wall bodies 79, 81 of the double jacket. The wall bodies 79, 81 in this embodiment are made as concentric cylinders.

A plurality of first and second hollow structures 405, 505 are attached to the inner wall body 79 and a second fluid 7 can flow around them. The main flow direction of the fluid 7 is disposed in the direction of the longitudinal axis 3. Since the fluid 7 is incident onto the hollow structures 5, 105, 205, 305, 405, 505, 605 extending in the interior of the wall body 79, it is deflected by these installations 4, that is the totality of the first and second hollow structures 5, 105, 205, 305, 405, 505, 605. The first hollow structures 5, 205, 405, 605 and the second hollow structures 105, 305, 505 can each be made up of a plurality of hollow bodies, as is shown in FIGS. 1, 3, 4, 5, 9.

The first hollow structures 5, 205, 405, 605 include an angle α 61 with the longitudinal axis; the second hollow structures 105, 305, 505 include an angle β 161 with the longitudinal axis. The angles α 61 and β 161 can have the same magnitude, but opposite signs, in accordance with a preferred variant. The first fluid 6 does not flow into the hollow structures over a base 60 here, as was shown in FIG. 1, but rather over the inner wall of the inner wall body. The representation in accordance with FIG. 8 as well as the content of the associated description can also be applied to this embodiment because a cross-wise arrangement of adjacent hollow structures is present.

FIG. 12 shows two sections through an apparatus in accordance with the embodiment shown in FIG. 11. The left hand part of FIG. 12 shows a radial section through the housing 2. The inner wall body 79 and the outer wall body 81 are shown cut open. Stubs 82, 83 for the introduction and draining of the first fluid are no longer visible in this section. Two separation elements 78 are arranged between the inner wall body 79 and the outer wall body 81. The right hand part of FIG. 12 shows a longitudinal section through the housing 2 and illustrates the flow directions of the first fluid 6.

The first fluid 6, which enters into the intermediate space between the inner wall body 79 and the outer wall body 81 via the inlet stub 82 flows through this intermediate space and enters into the interior of the first and second hollow structures (5, 105, 205, 305, 405, 505, 605) arranged cross-wise. The first fluid 6 flows cross-wise through the hollow structures and the part flows are introduced in the lower half of the housing 2 in the intermediate space bounded by the inner wall body 79 and the outer wall body 81 and are drained through the outlet stub 83. The second fluid 7 flows inside the inner wall body 79 and is deflected by the hollow structures 5, 105, 205, 305, 405, 505, 605. A heat exchange takes place simultaneously along the hollow structures as well as also over the surface of the inner wall body 79.

A collection element is here only sensible if it can be avoided that a substantial portion of the first fluid 6 forms a bypass and flows out of the apparatus again without flowing through the hollow structures 5, 105, 205, 305, 405, 505, 605. The collection element 84 is attached to a second end of the housing 2. Some of the hollow structures open into the collection element 84 so that the first fluid 6 is received in the collection element 84 after flowing through the hollow structures. Some of the hollow structures can be charged with the first fluid, starting from the collection element, so that the collection element has the function of a distribution element at least sectionally. The collection element has a blocking element 85 which prevents the first fluid 6 from forming a bypass without flowing through the hollow structures.

The blocking element 85 can also be made in ring shape and have a passage for entry of the second fluid 7 which thus flows in counter flow to the first fluid 6 guided in the double jacket or in cross-flow to the first fluid 6 guided in the hollow structures.

If, in contrast, the second fluid 7 exits through a passage arranged in the blocking element, the flow of the first fluid 6 and of the second fluid 7 takes place in parallel flow to one another if the flow is considered in the double jacket and in cross-flow to one another if the flow of the first fluid through the hollow structures is considered. The ratio of B1/B2 is larger than one in FIG. 12. The mixing and the heat exchange of the second fluid 7 is thereby surprisingly improved.

What is claimed is:

1. An apparatus for the heat exchanging and mixing treatment of fluid media comprising
    a housing disposed on a longitudinal axis;
    a first hollow structure disposed in said housing longitudinally of said axis for the passage of a first fluid therethrough and the passage of a second fluid thereover, said first hollow structure including at least two parallel tubes disposed adjacent each other to form a single flow obstruction to the second fluid with one of said tubes communicating with another of said tubes to convey the first fluid therethrough; and
    a second hollow structure disposed in said housing in communication with said first hollow structure for the passage of the first fluid therethrough and the passage of the second fluid thereover, said second hollow structure including at least two parallel tubes disposed adjacent each other to form a single flow obstruction to the second fluid with one of said tubes communicating with another of said tubes to convey the first fluid therethrough;
    said first hollow structure and said second hollow structure being arranged cross-wise with respect to one another, each said hollow structure having a flow cross-section with a first width B1 and a second width B2 perpendicular to said first width B1, with B1/B2 being larger than one and B1 oriented normally to a first plane containing said longitudinal axis of said housing, and
    each said hollow structure having at least one section extending at an angle towards a second plane perpendicular to said first plane and containing said longitudinal axis of said housing for deflecting the second fluid thereover and at least one section extending at an angle away from said second plane for deflecting the second fluid thereover.

2. An apparatus for the heat exchanging and mixing treatment of fluid media comprising
    a housing disposed on a longitudinal axis;
    a first hollow structure disposed in said housing longitudinally of said axis for the passage of a first fluid therethrough and the passage of a second fluid thereover, said first hollow structure including at least two parallel tubes disposed adjacent each other to form a single flow obstruction to the second fluid with one of said tubes communicating with another of said tubes to convey the first fluid therethrough;
    said first hollow structure having a flow cross-section with a first width B1 and a second width B2 perpendicular to said first width B1, with B1/B2 being larger than one and B1 oriented normally to a first plane containing said longitudinal axis of said housing;
    a second hollow structure disposed in said housing in communication with and crosswise to said first hollow structure for the passage of the first fluid therethrough and the passage of the second fluid thereover, said second hollow structure including at least two parallel tubes disposed adjacent each other to form a single flow obstruction to the second fluid with one of said tubes communicating with another of said tubes to convey the first fluid therethrough;
    said second hollow structure having a flow cross-section with a first width B1 and a second width B2 perpendicular to said first width B1, with B1/B2 being larger than one and B1 oriented normally to said first plane;
    a third hollow structure disposed in said housing longitudinally of said axis for the passage of a first fluid therethrough and the passage of a second fluid thereover, said third hollow structure having a flow cross-section with a first width B1 and a second width B2 perpendicular to said first width B1, with B1/B2 being larger than one and B1 oriented normally to said first plane; and
    a fourth hollow structure disposed in said housing in communication with and crosswise to said third hollow structure for the passage of the first fluid therethrough and the passage of the second fluid thereover, said fourth hollow structure having a flow cross-section with a first width B1 and a second width B2 perpendicular to said first width B1, with B1/B2 being larger than one and B1 oriented normally to said first plane;
    each said hollow structure having at least one section extending at an angle towards a second plane perpendicular to said first plane and containing said longitudinal axis of said housing for deflecting the second fluid thereover and at least one section extending at an angle away from said second plane for deflecting the second fluid thereover.

3. An apparatus as set forth in claim 2 wherein said first hollow structure includes three parallel tubes of circular cross-section disposed adjacent each other with one of said tubes communicating with the others of said tubes to convey the first fluid therethrough.

4. An apparatus as set forth in claim 2 wherein each of said third hollow structure and said fourth hollow structure is made of a plurality of hollow bodies disposed next to one another to form a single flow obstruction to the second fluid.

5. An apparatus as set forth in claim 2 wherein said first hollow structure includes a first section extending parallel to said longitudinal axis, a first curved connection member connected to said first section for conveying and deflecting the first fluid flowing therein, a second section connected to said first curved connection member to convey the first fluid therethrough, said second section extending at a first angle with respect to said second plane and a second curved connection member connected to said second section for conveying and deflecting the first fluid flowing therein.

6. An apparatus as set forth in claim 5 wherein said second hollow structure includes a first section extending parallel to said longitudinal axis, a first curved connection member connected to said first section for conveying and deflecting the first fluid flowing therein, a second section connected to said first curved connection member to convey the first fluid therethrough, said second section extending at a second angle with respect to said second plane and a second curved connection member connected to said second section for conveying and deflecting the first fluid flowing therein.

7. An apparatus as set forth in claim 6 wherein said first angle and said second angle differ in at least one of sign and magnitude.

8. An apparatus as set forth in claim 6 wherein said first angle and said second angle are of equal magnitude and of opposite sign.

9. An apparatus as set forth in claim 6 wherein at least one curved connection member is made of semicircular shape.

10. An apparatus as set forth in claim 6 wherein at least one curved connection member is made of one of a V shape and a U shape.

11. An apparatus as set forth in claim 2 wherein said second hollow structure has a first surface onto which the second fluid is incident and along which a first part flow of the second fluid is guided and from which a second part flow which leaves said first surface is directed into a fluid volume disposed thereabove or thereunder, said fluid volume being defined as a prismatic body with six rectangular surfaces formed by the rims of three adjacent hollow structures and bounded by a plurality of corner points so that a base surface, a top surface, a first side surface and a second side surface are open and other side surfaces of said fluid volume are formed from parts of said first surface of said second hollow structure and a second surface of said second hollow structure opposite said first surface whereby the second fluid is able to flow through said base surface, said top surface, said first side surface and said second side surface of said fluid volume so that a continuous dividing and combining of part flows takes place to effect a rearrangement and mixing of the second fluid.

12. An apparatus as set forth in claim 2 wherein said housing includes a collection element at an end thereof communicating at least one of said hollow structures with another of said second hollow structures to convey the first fluid therebetween.

13. An apparatus as set forth in claim 2 wherein said first hollow structure and said second hollow structure are spaced apart from each other to define a gap for passage of the second fluid therethrough.

14. An apparatus for the heat exchanging and mixing treatment of fluid media comprising
a housing disposed on a longitudinal axis;
a hollow structure disposed in said housing longitudinally of said axis for the passage of a first fluid therethrough and the passage of a second fluid thereover, said first hollow structure including at least two parallel tubes disposed adjacent each other to form a single flow obstruction to the second fluid with one of said tubes communicating with another of said tubes to convey the first fluid therethrough;
said hollow structure having a first width B1 and a second width B2 perpendicular to said first width B1, with B1/B2 being larger than one and B1 oriented normally to a first plane containing said longitudinal axis of said housing;
said hollow structure having at least one section extending at an angle towards a second plane perpendicular to said first plane and containing said longitudinal axis of said housing for deflecting the second fluid thereover.

15. An apparatus as set forth in claim 14 wherein said hollow structure includes three parallel tubes of circular cross-section disposed adjacent each other with one of said tubes communicating with the others of said tubes to convey the first fluid therethrough.

* * * * *